United States Patent Office 3,275,449
Patented Sept. 27, 1966

3,275,449
METHOD OF AGGLOMERATING SOLID PARTICULATE MATERIAL
Edward L. Fritzberg, Minneapolis, Minn., assignor to The Pillsbury Company, Minneapolis, Minn., a corporation of Delaware
No Drawing. Filed June 26, 1962, Ser. No. 205,224
21 Claims. (Cl. 99—80)

This inventionn relates to a novel method of controlling the reaction in systems or mixtures comprising normally solid and normally liquid materials or two or more normally liquid materials, in which the liquids in their normal states are physically or chemically reactable with the other liquid or solid materials with which they are mixed and to novel ways of treating certain specific materials which incorporate said aforementioned method and to certain novel products made thereby.

An object of this invention is to provide a novel method of mixing reactive solids and liquids or two or more reactive liquids together whereby the rate of reaction therebetween, whether physical or chemical, can be carefully controlled as desired.

Another object is to provide a novel method of uniformly moisturizing or hydrating moisture sensitive particulate material and increasing the moisture content thereof without forming lumps.

Still another object is to provide a novel method of preventing or delaying the reaction between inter-reactive materials until uniform homogeneous intermixing thereof has been completed.

Still another object is to provide a novel method for mixing inter-reactive materials which react immediately under normal conditions whereby the reaction therebetween can be prevented and delayed during mixing thereof and for as long thereafter as desired.

Still another object is to provide a novel method of controlled hydration of moisture sensitive particulate material whereby a given precise amount of liquid can be uniformly dispersed throughout said material, and whereby the increase in moisture content of the material can be carefully controlled.

Another important object is to provide a novel method of agglomerating particulate material which includes controlled mixing of the agglomerating medium and the material to be agglomerated to control the rate of reaction therebetween.

Still another object is a novel method of agglomerating heat labile materials.

Another object is to provide a novel method of adding moisture to moisture-sensitive particulate material to agglomerate said material whereby the amount of moisture added and the increase in moisture content of the particulate material can be carefully controlled, which method of agglomeration is easier and less expensive than many known agglomeration processes.

Another object is to provide a novel method of moisturizing various flours and flour mixtures under controlled conditions to improve the physical characteristics thereof and facilitate the handling thereof and the preparation of products made therefrom, and to form new products therefrom.

Another object is to provide a novel method of preparing bakery products which requires less shortening and less moisture than usual, thereby reducing the baking time and drying load on the ovens.

Still another object is a novel refrigerator product consisting of a liquid in solid frozen form admixed with either another liquid in frozen solid form or a normally solid material and physically or chemically reactive therewith when in the liquid state.

These and other objects and advantages of the invention will more fully appear from the following description.

The method of this invention applies to the mixing of materials which are sensitive to and physically or chemically reactive with each other in their normal states and comprises solidifying normally liquid material (such as water) by freezing same to a hard, friable form (hereinafter referred to as ice), reducing the frozen liquid or ice to particulate form, and mixing the particulated solidified liquid material with normally solid material also in particulate form or with another normally liquid material which has also been solidified by freezing and reduced to particulate form. The freezing of the normally liquid components prevents or delays the physical or chemical reaction between the materials comprising the mixture during mixing thereof. The frozen liquid components are permitted to thaw or melt and return to their normally liquid state during mixing or at any time desired after the ingredients comprising the mixture are thoroughly admixed to the extent desired, thereby effecting and completing the desired reaction between the liquid and solid, or liquid and liquid, components of the mixture.

The particle size of the solid and frozen liquid components may vary according to the particular operational conditions employed and the end result or product desired. Generally, however, it is desirable and preferable to have the solid particles in fine pulverulent or powdered form to provide a large solid particle surface area for contact with the frozen liquid particles as they melt, to provide more uniform distribution of the liquid and moisturization of the solid material, and to enable agglomerates comprising a multiplicity of particles bonded together to be formed. The frozen liquid particles are also preferably of fine pulverulent or powdered form. However, coarser frozen liquid particles can be used, particles as large as U.S. Standard 4 mesh having been successfully employed. The coarser particles can be effectively employed particularly in those circumstances where the solid particles do not melt enough frozen liquid in being cooled to the temperature of the frozen liquid to become excessively moist, and where the rate of movement of the frozen particles through the solid particles is such as to permit only a short time of contact. Thus, the invention embodies adding a frozen finely divided normally liquid chemical or physical reactant having a melting poit below that of the components to which it is added to a dry or frozen substance or mixtures of dry, frozen or dry and frozen substances, maintaining the temperature of the mixture below the melting point of the reactant while agitating the ingredients to form a uniform mixture, and heating the uniform mixture or otherwise causing the reactant to melt and, in its liquid state, react with the main body of unmelted material.

The return of the normally liquid components from their frozen solidified state to their normally liquid state may take place substantially simultaneously with the admixing thereof with the other components of the mixture or it may take place immediately thereafter, or the reaction may be delayed for as long a time as it is considered desirable by maintaining the mixture at temperatures below the melting point of the solidified liquid components, thereby keeping the liquid frozen and unreactive. In most instances, the melting of the frozen liquid is preferably accompanied by continuous mixing to keep the particles in constant motion and thereby continuously bring unhydrated solid particles into contact with the melting frozen particles.

In some instances, it is preferable at the start of the mixing or blending to have the non-frozen, non-liquid ingredients pre-cooled to a temperature at or below or only slightly above the melting point of the frozen liquid ingredients which are being mixed therewith, to enable the ice to become thoroughly dispersed throughout the mixture before it begins to melt and react. Once this thorough dispersion has been accomplished, the ice is then permitted to melt and become reactive. In other situations, the melting of the ice will be slow enought at ordinary room temperatures so that pre-cooling of the non-liquid components and mixing at temperatures below the melting point of the ice is unnecessary. This is particularly true when the solids have a low specific heat and are capable of absorbing the amount of liquid melted by contact with the ice. In most instances, it is preferable to continuously mix the ingredients while the ice is melting and until the melting and reaction are completed.

The rate of melting is governed by the rate of heat transfer to the mixture by the environment and the mixing action and may be controlled by any suitable means to thereby control the rate of reaction between the components comprising the mixture. Thus, the mixture may be permitted to slowly and naturally warm up by transference of heat from the solid particles to the ice and simply allowing it to extract heat from the surrounding atmosphere, or more positive and rapid direct heating means may be provided, such as applying heat to the container housing the mixture. When relatively small batches of material are involved, there is usually sufficient heat from the mixing and surrounding environment to melt the ice in a reasonable length of time. With larger scale operations, additional heat from some other source is desirable in order that the time involved can be controlled and reduced to practical limits. The reaction conditions are preferably controlled so that the melting liquid is absorbed by the normally solid particles at a rate faster than the ice melts, thereby preventing any localized collection of excess liquid and lumping in the early stages of mixing, and achieving uniform distribution of the ice throughout the mixture, and uniform moisturization thereof.

Thus, excess free liquid is not available at any time, the liquid as it melts and becomes available being immediately absorbed and reacted with the solid material. Thus, under properly controlled conditions, the frozen liquid particles, when examined during mixing and melting, are essentially or apparently "dry." Achieving this depends on the particle size, temperature and specific heat of the solids, and the rate of mixing. When the solids are pre-cooled to freezing temperatures or below, and the ice is in finely divided form, slow mixing is adequate to prevent excess free liquid becoming available. When the ice particles are coarse and non-uniform, and especially when the solids at the start of the mixing operation are at a temperature substantially above the freezing point of the ice, high speed mixing is necessary to provide a rapid change of the particles contacting the ice and thereby prevent the availability of excess free liquid. With rapid mixing and solids of low specific heat, the temperature of a mixture initially substantially above the freezing point of the ice is quickly lowered so as to approach said freezing temperature, at which point the rate of melting of the ice is relatively slow. The uniformity of distribution of the various components also depends on the particle size and the degree of mixing thereof, the finer the particles the more uniform the distribution. By this method, it is possible to mix extremely reactable materials and to closely control the rate of their reaction since the freezing of the liquid components prevents any reaction at all until melting thereof takes place, which melting can be delayed until the blending of the components has been completed and the rate of reaction can be made as fast or as slow as desired by simply adjusting and controlling the rate at which the ice melts. The rate of melting and reaction and time for completing same also depend upon the particle size, temperature of the mixture, and rate of mixing and can be carefully controlled by controlling and varying these factors as desired.

The method of this invention is applicable to the treatment of organic and inorganic food and non-food materials and has a wide field of useful application, typical examples of which are set forth hereinafter.

This method of controlling the reaction of the components of a mixture finds particular applicability and usefulness in the agglomeration of pulverulent material and constitutes a novel successful method of accomplishing same. To accomplish agglomeration of dry particulate material by this method, dry particulate moisture sensitive material to be agglomerated is mixed with a solidified normally liquid agglomerating medium or agglutinant such as water which is capable of forming adhesive surfaces on the solid particles and which has been frozen and reduced to particulate form such as pulverized or crushed ice. The ice is then allowed to melt and return slowly to the liquid state, thereby moisturizing or wetting the solid particles and forming adhesive surfaces thereon and thereby causing the solid particles to agglomerate. The mixture is preferably continuously mixed during the melting of the ice and the agglomeration of the solid particles in order to uniformly disperse and distribute the liquid throughout the mixture, to prevent excess free liquid becoming available, and to form a more porous more readily wettable and, depending upon the product, more dispersible agglomerate structure. The agglomerates are preferably dried to remove the added moisture therefrom. This usually increases the strength and shelf life of the agglomerates. However, it is understood that the invention is not limited to this drying operation. Thus, in most instances, the mixing and drying of the dry particulate material and frozen particulate liquid results in fusion of the frozen particles, local solution of the dry particles, and sintering of clusters of particles into agglomerates. These agglomerates are free flowing, non-caking and more easily hydrated than unagglomerated material and withstand mechanical breakdown during handling.

Typical examples of materials which have been successfully agglomerated by this method are flour, breakfast cereals; biscuit, cake and cookie mixes; polyvinyl alcohol powder; sugar; sodium hexametaphosphate; yeast; egg albumen; whole egg powder; mixtures of self-agglutinating and non-self-agglutinating flours; and non-fat dried milk solids.

The following are some specific examples of agglomerated materials from this list. In each of the following examples, the ingredients were mixed with a bladed mixer at room temperatures until the latent heat of the dry normally solid particulate material and the heat of mixing caused the frozen particulate liquid (water, except where otherwise indicated) to melt. The frozen particulate material of the specific examples set forth in this disclosure was pulverized and had an approximate size ranging from U.S. Standard 4 mesh to fine snow. The ingredients were continuously mixed during melting to continuously effect fresh contact between unhydrated normally solid particles and free melted liquid. As a result, the liquid was evenly distributed and absorbed without the formation of large lumps, balls or masses; the moisturized particles sticking together and forming free flowing, dustless, non-caking, readily wettable agglomerates which were dried to remove added moisture therefrom.

SOYA FLOUR

| | Grams |
|---|---|
| Soya flour | 700 |
| Pulverized ice | 300 |

OAT AND MALTED BARLEY FLOURS

| | |
|---|---|
| Oat flour | 560 |
| Malted barley flour | 140 |
| Pulverized ice | 350 |

The oat flour served as the agglutinating agent, the malted barley as a flavoring agent, the oat flour bonding the particles together with no additional agent such as gluten.

WHEAT FLOUR—MILK SOLIDS

| | Grams |
|---|---|
| All purpose wheat flour | 700 |
| Pulverized frozen milk | 340 |

NOTE.—Use of frozen milk as the agglomerating agent.

NON-FAT MILK SOLIDS

| | Grams |
|---|---|
| Non-fat dried milk powder | 950 |
| Lactose | 50 |
| Pulverized ice | 80 |

SUCROSE

| | |
|---|---|
| 6X powdered sucrose | 1000 |
| Pulverized ice | 50 |

BAKERS' YEAST

| | |
|---|---|
| Powdered dried yeast | 500 |
| Pulverized ice | 150 |

POLYVINYL ALCOHOL

| | |
|---|---|
| Polyvinyl alcohol | 300 |
| Pulverized ice | 120 |

20–40% ice has been found to be a preferred range for successfully agglomerating polyvinyl alcohol.

SODIUM HEXAMETAPHOSPHATE

| | Grams |
|---|---|
| Powdered Calgon (sodium hexametaphosphate) | 1000 |
| Pulverized ice | 50 |

Other specific examples are set forth and discussed in more detail hereinafter.

This novel agglomerating method has certain advantages over conventional methods, most of which require that the mixing and agglomerating be carried out in machines which disperse the particles in a humid atmosphere. The use of ice does not require this dispersion in a humid atmosphere to achieve uniform wetting of the particles, nor the apparatus for accomplishing same, and enables agglomeration to be achieved by a simpler process and with less equipment than conventional methods.

In solid-liquid systems, the method of this invention also has great utility as a means of increasing the moisture content of particulate material to any given degree, since it permits careful control of the moisturizing operation and enables any given amount of moisture to be uniformly distributed throughout the particulate material being moisturized in a single operation with a minimum of equipment and with equipment already available. Knowing the degree of increase in moisture desired, it is a simple matter to calculate and determine in advance the amount of moisture needed to accomplish the moisturization. The proper amount of liquid needed to accomplish the desired moisturization is then simply reduced to solidfied form by freezing, pulverized and mixed with the particulate solid material until the fine ice particles are uniformly and homogeneously distributed throughout. Then the ice particles are permitted to slowly melt, preferably with continuous agitation whereby the melted liquid is uniformly distributed throughout the mass of particulate material. Addition of a similar amount of water in the liquid state to the particulate material results in heavy localized concentration and reaction of the liquid in the particulate mass with the moisture being unevenly distributed in the mass, with some portions of the particulate material being over-moisturized and other portions under-moisturized or unmoisturized. The localized over-moisturization in many instances produces undesirable lumps of particulate material which the method of this invention avoids.

The invention also finds utility in controlling the type and rate of reaction between extremely reactable materials, particularly where it is preferable or necessary to have the reacting materials thoroughly intermixed before any substantial amount of reaction takes place therebetween. The delay in, and control of, the reaction between the material is desirable in some instances to prevent a violent reaction between the materials which under normal mixing procedures are dangerous to handle and mix because of the danger of explosion, overheating, etc. In other situations, the method of this invention enables substances which are very sensitive to one another to react uniformly which might otherwise be very difficult to uniformly react due to the initial localized reaction between a part of one reactant and part of another. The solution of these problems is applicable to systems involving fluids including solid-liquid systems and liquid-liquid systems and systems utilizing a liquifiable gas.

This invention also finds utility in permitting pre-mixes of extremely reactable materials to be prepared in advance and stored in unreacted condition until needed.

Moisturization and agglomeration by the method of this invention is exemplified in the treatment of wheat flour. There has long been a need for a single, inexpensive method of adding a considerable amount of water to wheat flour without producing a dough. According to this invention, 25–45% water in the form of finely crushed ice can be mixed with wheat flour until the ice melts, producing a free flowing mixture of agglomerated flour particles. Agglomerates are formed because the protein in the flour is hydrated and mechanically worked to such an extent that cohesive gluten is formed. Addition in one increment of similar amounts of water in the liquid state produces sticky heavy doughs because the flour is unable to absorb the water instantly. By adding the water in the form of ice, it can be absorbed by the flour faster than it can melt. This method is also particularly suitable for adding lesser amounts of water to flour, which are insufficient to glutenize the protein and cause agglomeration, but which serve to uniformly increase the moisture content of the flour without producing a dough. The applicability of this invention to the treatment and preparation of various types of flour products is illustrated by the typical examples set forth hereinafter.

Pre-glutenized flour

In making bread or similar yeast leavened products, it is the normal practice to add water or milk to flour and mix the resulting dough until the proper gluten strength develops. This imparts the proper texture to the final product. By utilizing the method of this invention a pre-glutenized flour can be produced which requires only the addition of water to attain similar high gluten strengths. Pre-glutenized flour is prepared according to this invention by hydrating hard or soft wheat flour with pulverized ice while continuously mixing to increase the moisture content of the flour to a final moisture content of 30 to 35%. By usual methods of water addition, this level of water absorption would produce a sticky dough. Because the water is added to the flour as pulverized ice, there is no lumping of the flour. The flour becomes cold after the pulverized ice is mixed therewith and the ice melts slowly enough to permit the flour to uniformly absorb the water without producing sticky dough. The continuous mixing during the melting of the ice helps to develop the gluten. The gluten causes the flour particles to adhere to one another and form a crumbly free-flowing mixture composed of small agglomerates of flour particles. The cold crumbly mixture of agglomerates is transferred to a vacuum dryer after all the ice is melted. There it is carefully dried without heat or with only sufficient heat (for example at 120° F.) to speed the evaporation of the water without raising the product temperature to the point where the proteins are denatured. The dried product is then finely ground to a flour that has retained its gluten in an undenatured state and is capable of absorbing greater quantities of water than untreated flour. The final dried product yields a dough with considerable gluten strength when mixed or reconstituted with the proper amounts of water. The following are typical examples of preglutenization by the aforedescribed method:

HARD WHEAT FLOUR

| | Grams |
|---|---|
| Unbleached hard wheat flour | 2000 |
| Pulverized ice | 700 |

SOFT WHEAT FLOUR

| | |
|---|---|
| Soft wheat flour | 1400 |
| Pulverized ice | 600 |

This final pre-glutenized flour product may serve as the flour component of instant bread mixes, pizza mix, and the like, and also produces the non-sticky doughs essential to the preparation of spaghetti and macaroni. If desired, the undried hydrated agglomerated flour may be washed with water to yield the starch and gluten, the small size of the glutenized flour particles faclitating the washing of the starch therefrom. The just described preglutenization of flour incorporating the method of this invention illustrates not only the novel method of pre-glutenizing flour but also illustrates several of the aforementioned advantages resulting from the use of the method of this invention, namely the formation of an agglomerated product and also the ability to precisely control the increase in moisture of particulate material and to be able to moisturize particulate material without the usual formation of lumps.

Breakfast cereals

The method of this invention may also be successfully utilized in preparing farina-like breakfast cereals by hydrating and agglomerating various cereal flours such as wheat, oats and rye or mixtures thereof. The process consists of continuously mixing a cereal flour or a blend of cereal flours with sufficient pulverized ice until the flour particles are hydrated and agglomerated as hereinbefore described. The addition of the ice reduces the temperature of the mixture and because the ice melts slowly, the proteins of the cereal flour are hydrated at a rate which is slower than the abiilty of the proteins to absorb it. Consequently, even with additions of 30% water, a non-sticky free flowing agglomerated product is produced.

After the agglomerates are formed, they are then dried as in an air oven with or without toasting at a high enough temperature to denature the proteins to improve the flour for its subsequent use as a cooked breakfast cereal. The final product hydrates rapidly in boiling water, and the agglomerates swell but do not disperse because of the denatured proteins which bond the flour particles together and minimize the tendency of the particles to disperse. This cooked product has a mouth feel similar to a coarse farina. For some purposes, it is more desirable to produce a product having undenatured proteins. In such cases, the hydrated agglomerated flour is dried at low temperatures at which denaturation does not take place, such as by vacuum drying. This cereal can be prepared in any combination of cereals and it can be flavored as desired and be fortified with protein concentrates, vitamins, and mineral to provide a very nutritive cereal. Some of the products produced can be eaten as cooked or cold cereal. Also, mixtures of different agglomerates can be blended to provide color and taste contrast in the final product.

A typical example of the foregoing is as follows:
725 grams of oat flour was continuously mixed with 300 grams of pulverized ice (water) until the latent heat of the flour and the heat of mixing caused the ice to melt. The continuous mixing caused fresh contact between unhydrated flour particles and free water, resulting in very even distribution of absorbed water and freedom from lumping. As the water content of the flour increased, the proteins hydrated and became sticky, forming the bonding agent for the flour and effecting agglomeration thereof. The agglomerates were then air oven dried at 250° F. and denatured, and produced a farina-like breakfast cereal when cooked in hot water.

Cookies

Cookies may be prepared by a novel procedure incorporating the method of this invention. The process consists of hydrating and agglomerating a mixture of suitable cookie ingredients (which may include shortening, not more than 10% thereof being necessary) forming (and compacting if necessary) the agglomerates, and baking the formed and/or compacted hydrated agglomerates. More specifically, the mixture containing the desired ingredients for a cookie product are mixed continuously with sufficient pulverized ice (not more than 10% being necessary) for a long enough time to melt the ice and to form agglomerates of the hydrated cookie mix. These hydrated or wet agglomerates are free flowing and are easily transferred to baking pans as such, or may be first formed into cookies. The agglomerated cookie mix is then baked for about fifteen minutes in a 350 degree oven. During baking, the particles sinter together to form a porous cake which, when cooked, has the eating quality of a cookie. As an alternative, dried agglomerates may be re-wetted, formed into cookies and baked. As an example, 100 grams of dried agglomerates was hydrated with 15 grams of water, compacted into wafers and baked. This process has several advantages over the present method of making cookies. For example, the amount of water needed and used is limited (not more than 10%) as compared with conventional cookie doughs requiring considerably higher moisture contents (as high as 30%) and therefore the drying load on the oven is less than with normal cookie mixes.

Also, the amount of shortening necessary is decreased from the normal 15–40% to about 10% or less, thereby producing cookies with lower fat contents than normal. The baking time is shorter, making the oven capacity required for a given production less than usual, and the free flowing character of the agglomerated mix is such that feeding and forming operations are facilitated. The process is also easily automated, and produces novel cookie structures.

The product differs from the usual concept of cookies in that the porous structure results not so much from the leavening system as from the sintering of the dampened agglomerates.

Mixed cereals

Some cereal flours are capable of forming agglomerates (are self-adhering or self-agglutenating) while others are not. By blending in proper proportions a potentially strongly cohesive flour such as wheat with others that are weak, agglomerates of sufficient strength to enable them to withstand mechanical breakdown during handling and disintegration during cooking can be prepared. As an example, sesame meal (after expression of oil) is not self-agglutenating. However, by blending 140 grams of said sesame meal with 560 grams of wheat flour and 260 grams of pulverized ice (water), and treating as hereinbefore described, acceptable agglomerates comprising sesame and wheat particles have been formed.

Synthetic tapioca

The previously described method of this invention of hydrating flour with pulverized ice has been found to be important in a new method of producing synthetic tapioca. To produce synthetic tapioca by this new method, sufficient pulverized ice is blended with the flour to form free flowing agglomerates which are compacted by extrusion and cut into tapioca size pieces or segments. The segments are then heated and dried at a temperature (250° F. for example) which will denature the proteins. Because gluten is formed during the blending of the flour and the ice, and because the subsequent heat treatment during drying denatures the proteins, the dried product when reconstituted or cooked with hot water swells and produces hydrated tapioca-like pieces similar in bland taste and mouth feel to tapioca, making the product suitable for substitution for real tapioca. As a typical example, synthetic tapioca was formed from 500 grams of hard wheat flour and 272 grams of crushed ice (water).

Cake mix

The method of this invention can be successfully utilized in converting cake mix into a form which is much easier to handle. Cake mix, because of the fineness of particle size of its ingredients, does not flow rapidly enough to be packed by high speed machines. By agglomerating the cake mix with a small amount of ice, as hereinbefore described, and drying the agglomerates, the cake mix is converted into a form in which the flow properties are greatly enhanced because the agglomerates are free flowing whereas the cake mix in its very fine particle size is not. The cake mix is maintained at relatively low temperatures during the agglomeration thereof, to minimize the effect on the leavening ingredients. Furthermore, the cake mix increases in bulk density when agglomerated, thus facilitating the packaging and handling thereof. As a typical example, 568 grams of chocolate cake mix was blended with 52 grams of crushed ice (water) until the ice melted and the agglomerates were formed. The agglomerates were spread out in a shallow layer and baked at 350° F. for 12–15 minutes and then cooled.

The agglomerated cake mix of this invention has a variety of novel uses, one of which is for use as a pie crust material similar to crushed graham crackers.

Gelatinization

The principle of controlled hydration of this invention is also very effective in gelatinizing starch and flour. By mixing the starch or flour with a limited amount of water in the form of pulverized ice and then subsequently treating with steam, the starch cell damage is controlled and there is a minimum of free starch in the final product.

Refrigerated ready-to-bake cake mix

The controlled hydration method of this invention can also be successfully applied to the preparation of a refrigerated complete cake mix, which requires only warming and baking by the purchaser to achieve the desired cake product. To prepare the refrigerated cake premix, a pre-cooled cake mix to which powdered egg has been added is mixed with the required amount of liquid such as pulverized ice, with the ice being uniformly dispersed throughout the mixture and maintained in a frozen state until the mix is ready for use. At refrigerated storage temperature, the premix is completely free flowing. To prepare a cake from this refrigerated premix, all that is required is that the premix be warmed to melt the ice and produce a batter which is then baked without further mixing. As a typical example, 510 grams of chocolate cake mix was pre-cooled well below 32° F. with Dry Ice. Two eggs were gradually added to the pre-cooled cake mix, the eggs freezing immediately into brittle flakes. 354 grams of crushed ice (water) were then blended in, the liquid ingredients being maintained in frozen form, forming a free flowing product which was packaged and stored under freezer conditions. The frozen mixture was later transferred to baking pans and baked into a cake, which baking can take place either before or after thawing at room temperature.

This example illustrates the fact that the method of this invention can also be accomplished by pre-cooling the normally solid material to a sufficiently cold temperature whereby the liquid can be added thereto in liquid form and immediately frozen before reacting with the solid material, the blending and melting then being accomplished as hereinbefore described.

Biscuits

According to the method of this invention, refrigerated biscuits are prepared by continuously mixing the ingredients of a standard dry biscuit mix with particulated ice to achieve controlled hydration thereof which permits the proper gluten development to take place, prevents gas loss from the leavening system, and forms free flowing agglomerates. The free flowing agglomerates may be dried for use as such, or they may be fed in undried form to a machine in which a measured quantity of agglomerates are compressed to biscuit form. The biscuits may then be baked, causing the agglomerates to fuse into an integral piece of dough or the biscuits may be packaged as a typical refrigerated ready-to-bake biscuit. This novel method eliminates a considerable amount of labor involved in presently known processes, provides a simplified cleaner mixing process, and eliminates sheeting and cutting of the dough and recycling of the trim. The dried agglomerates are suitable for topping or as an ingredient for other composited food products. As a typical example of this method as applied to biscuits, 700 grams of standard dry biscuit mix were blended with 300 grams of water in the form of crushed ice to form ice free, free flowing agglomerates which were then baked in a shallow layer in a 365° F. oven.

Hazardous chemicals

Hazardous chemicals such as perchlorates can be frozen, reduced to particulate form, and blended with other solidified normally liquid frozen reactants prior to use. By controlling the rate of melting of the ingredients, the rate of reaction can be regulated and by blending and storing at sub-freezing temperatures, the mix can be stored for immediate use at any time.

Plastic foams

Plastic resins and catalysts normally liquid at room temperature can be frozen, reduced to particulate form and blended together as frozen powders. By blending and storing at sub-freezing temperatures, the catalyzing of the resins can be delayed as long as desired, and the mixture can be conveniently stored ready for immediate use at any time, it being understood that thawing of the ingredients would initiate the reaction.

It will also be recognized that the reaction of a gas with a solid may be delayed or controlled by liquifying and freezing it before blending with other solid reactant and that both normally liquid and liquifiable gaseous fluid reactants come within the purview of this invention.

From the foregoing, the advantages of this invention are readily apparent. It constitutes a new way to hydrate or blend a solid and a liquid, or two or more liquids. It provides a novel simple method of controlling the uniformity of mixtures of ingredients that would otherwise react physically or chemically before mixing thereof is completed; provides a method of carefully controlling rates of reaction; enables mixtures of reactable chemical components to be prepared and stored under refrigeration until the reaction is desired; provides a novel and efficient method of agglomerating material in fine pulverulent form; provides a method of preparing dried flour containing proteins already combined as gluten; enables simulated tapioca or paste products to be prepared from soft or hard wheat flours; enables heat labile materials to be successfully agglomerated or hydrated; provides a method of gelatinizing starch to varying degrees by careful control of the amount of water that is brought in contact with the starch to achieve gelatinization thereof; provides a method of preparing a complete refrigerated cake mix; and provides a new method of preparing refrigerated biscuits.

It will, of course, be understood that various changes may be made in the form, details, arrangements and proportions of the various parts without departing from the scope of this invention.

What I claim is:

1. A method of agglomerating comprising forming a mixture of solid particulate material to be agglomerated and frozen particulated liquid in an amount capable of bringing the final moisture content to between about 5 and 50% by weight of the mixture, and melting the frozen particles in the mixture and converting same to liquid form whereby the liquid forms adhesive surfaces on the solid particles and the adhesive particles are bonded together in the form of agglomerates.

2. A method of agglomerating solid particulate material comprising forming a mixture of frozen particles and said material in an amount capable of bringing the final moisture content to between about 5 and 50% by weight of the mixture, and melting and liquifying the frozen particles in said mixture while continuously mixing said mixture and repeatedly bringing the melting particles in contact with different solid particles whereby the particulate material is bonded together and agglomerated by the melted liquid.

3. The method of claim 2, wherein the mixing and melting are controlled whereby the solid particles absorb the melted liquid as fast as the frozen particles melt.

4. A method of preparing pre-glutenized agglomerated wheat flour comprising mixing together wheat flour and edible pulverized ice in an amount capable of increasing the moisture content of the flour to a final moisture-content of approximately 30–35%, melting the ice at a rate sufficient to permit the flour to uniformly absorb the melted liquid without producing sticky dough, and continuously mixing the flour-ice mixture during the melting of the ice whereby the moisturized flour is worked to form gluten, said gluten causing the flour particles to adhere to one another and form free-flowing agglomerates.

5. The method of claim 4, including drying of the agglomerates without denaturing the flour proteins, and grinding the dried product to a flour.

6. A method of obtaining starch and gluten from flour comprising hydrating flour by mixing said flour with pulverized ice, melting the ice at a rate sufficient to permit the flour to uniformly absorb the melted liquid without producing stickly dough, continuously mixing the flour-ice mixture during the melting of the ice to develop the gluten in the moisturized flour particles and thereby form a free-flowing mixture composed of smal agglomerates of glutenized flour particles, and washing the agglomerates to separate the starch and gluten.

7. A method of preparing farina-like breakfast cereals comprising mixing cereal flour with edible pulverized ice in an amount capable of bringing the final moisture content to between about 5 and 50% by weight of the mixture, melting the ice in the mixture with continuous mixing thereof and thereby forming a free flowing agglomerated product, and drying said product and denaturing the flour proteins.

8. A method of preparing cookies comprising forming a mixture of the desired ingredients for a cookie product and an edible liquid in pulverized frozen form in an amount capable of bringing the final moisture content to between about 5 and 50% by weight of the mixture, melting the frozen particles while continuously mixing the mixture for a sufficient period of time to cause the particles to bond together whereby the particles comprising said mixture are hydrated and formed into a free-flowing agglomerated product, forming the hydrated agglomerates into cookies and baking the cookies thereby causing the agglomerated particles to sinter together to form a porous product which when cooled has the eating quality of a cookie.

9. The method of claim 8, wherein not more than 9% liquid in frozen form is added to the cookie ingredients.

10. A method of preparing a flour product containing flour which is not self-agglutinating, said method comprising forming a mixture of self-agglutinating flour, non-self-agglutinating flour and an edible liquid in frozen particulate form in an amount capable of bringing the final moisture content to between about 5 and 50% by weight of the mixture, and melting the frozen particles while continuously mixing said mixture for a sufficient period of time to cause the particles to bond together whereby said self-agglutinating flour is moisturized and becomes adhesive and whereby the particles comprising said mixture are bonded together by said adhesive particles to form a free flowing agglomerated product.

11. The method of claim 10, wherein said mixture includes sesame meal and wheat flour.

12. A method of preparing a tapioca-type product comprising forming a mixture of flour and an edible pulverulent ice in an amount capable of bringing the final moisture content to between about 5 and 50% by weight of the mixture, continuously mixing said mixture for a sufficient period of time to cause the particles to bond together and simultaneously melting said ice whereby the flour is glutenized and agglomerated, compacting the agglomerates into tapioca size pieces, drying said agglomerates and denaturing the flour proteins.

13. A method of preparing biscuits comprising forming a mixture of dry biscuit mix and an edible liquid in frozen particulate form in an amount capable of bringing the final moisture content to between about 5 and 50% by weight of the mixture, melting the frozen liquid to moisturize the biscuit mix and form free flowing agglomerates, and compressing and shaping the wet agglomerates into biscuit form ready for baking.

14. The method of claim 13, wherein the wet agglomerates in shaped biscuit form are frozen.

15. A method of pre-glutenizing wheat flour comprising exposing the flour to ice, a sufficient portion being present in the form of a solid after contact with the flour to prevent the formation of a continuous dough mass and a sufficient portion of which is present as a liquid after contact with the flour to increase the moisture content thereof to a gluten developing level and continuously mechanically mixing the moisturized and separated particles to mechanically work the moisturized particles during the melting of the ice and thereby develop gluten which bonds the particles together in the form of agglomerates, said moisture being present in an amount capable of bringing the final moisture content to between about 5 and 50% by weight of the mixture.

16. The method of claim 15, including drying the agglomerates without denaturing the flour proteins.

17. The method of claim 16, including reducing the dried agglomerates to finely ground flour.

18. A method of preparing a cookie type product comprising forming a mixture of the desired cookie ingredients including not more than 10% shortening and an edible liquid being in particulate frozen form in an amount capable of bringing the final moisture content to between about 5 and 50% by weight of the mixture, melting the frozen particles while continuously mixing said mixture for a sufficient period of time to cause the particles to bond together to form a free flowing agglomerated product, and baking said agglomerated product and thereby sintering the particles comprising the agglomerated product together to form a porous product having the eating quality of a cookie.

19. The method of claim 18, wherein not more than 10% liquid in frozen form is mixed with the cookie ingredients.

20. A method of preparing tapioca from flour comprising adding to said flour moisture in an amount sufficient to bring the final moisture content to between 5 and 50% by weight of the mixture, a sufficient portion of said moisture being present after addition to hydrate the flour and form agglomerates of hydrated glutenized flour and a sufficient portion of said moisture being present in the form of ice crystals to prevent the formation of a continuous dough mass whereby discrete agglomerates are formed, thereafter compacting said agglomerates into tapioca size pieces, drying said pieces and denaturing the flour proteins.

21. A method of preparing a more readily hydrated, difficult-to-disperse flour product comprising adding moisture in an amount capable of bringing the final moisture content to between about 5 and 50% by weight of the mixture to the flour in the form of pulverized ice, mixing the ice and flour until agglomerates form and denaturing the flour proteins in the agglomerates.

References Cited by the Examiner

UNITED STATES PATENTS

| | | | |
|---|---|---|---|
| 1,155,977 | 10/1915 | Vernon | 99—93 |
| 1,727,429 | 9/1929 | Fisher | 99—93 |
| 2,021,012 | 11/1935 | McCullough | 23—107 |
| 2,055,332 | 9/1936 | Bryan | 23—107 |
| 2,358,827 | 9/1944 | Rakowsky et al. | 99—93 |
| 2,388,902 | 11/1945 | Callaghan | 127—67 |
| 2,530,823 | 11/1950 | Kilanden et al. | 127—67 X |
| 2,557,032 | 6/1951 | Kilander | 127—67 |
| 2,900,256 | 8/1959 | Scott | 99—56 |
| 3,046,259 | 7/1962 | Hess et al. | 260—91.3 X |
| 3,158,486 | 11/1964 | Morck et al. | 99—86 |

FOREIGN PATENTS 236,311  11/1961  Australia.

A. LOUIS MONACELL, *Primary Examiner.*

ABRAHAM H. WINKELSTEIN, *Examiner.*

R. N. JONES, *Assistant Examiner.*